United States Patent Office 2,963,371
Patented Dec. 6, 1960

2,963,371

EMULSIFYING AGENTS IN SHORTENING AND PROCESS OF PRODUCING SAME

Harland H. Young, Western Springs, and Kurt H. Spitzmueller, Clarendon Hills, Ill., assignors to Swift & Company, Chicago, Ill., a corporation of Illinois No Drawing. Filed Oct. 14, 1957, Ser. No. 690,156

8 Claims. (Cl. 99—118)

This invention relates to shortening compositions and more particularly to the production of shortening products having improved properties.

The development in about 1933 of "superglycerinated" shortenings which contain added mono and diglycerides as emulsifiers stimulated interest in the manufacture of shortening products having superior emulsifying properties. Since that time various other shortening emulsifiers have been suggested such as partial fatty acid esters of sorbitol and their polyoxyethylene derivatives. These emulsifiers are effective in promoting and stabilizing emulsions and depending upon the balance between the lipophilic and hydrophilic portions of their molecules can be used in various food products where emulsifying properties are required.

Shortenings having superior emulsification properties are particularly desirable in the production of bakery and confectionery products. Bread in which these shortenings are employed is more tender and exhibits greater resistance to staling than bread made with shortening containing no emulsifier. The cellular structure of cakes is very markedly affected by the shortening used in preparing them and thus the choice of a shortening to be used in cake baking is a very important factor. In order to permit the incorporation of large amounts of sugar in cakes it is necessary that the cake dough contain a substantial proportion of liquids. Inasmuch as the dough is quite fluid, a strong emulsifying agent is required to strengthen it in order that it will rise properly and develop the proper cellular structure. In addition, the texture and volume charactertistics of cakes are profoundly affected by the type of shortening used in the manufacture of these products.

It is therefore an object of this invention to provide an improved shortening composition having improved emulsifying properties.

A further object of this invention is the provision of a method for producing a shortening well adapted to use in food products where emulsifying properties are required.

Additional objects if not specifically pointed out herein will be readily apparent to one skilled in the art from the following detailed description.

In general, the present invention contemplates the addition to a glyceridic composition having shortening properties of a small amount of a mixture comprising the reaction product obtained from heating fatty acids and/or fatty alcohols with beta-propiolactone. The reaction is carried out in such a fashion that polymeric products form a part of the final mixture. Usually not more than about 20 percent polymeric materials will be present in this final product although lesser amounts may be formed in the reaction.

The emulsifying additives of this invention are desirably prepared by reacting a fatty acid and/or fatty alcohol with beta-propiolactone to produce in addition to the fatty ester or fatty ether of beta-hydoxy propionic acid, various polymeric products resulting from the reaction of the ether or ester formed with an excess amount of the lactone.

In the reaction of a typical fatty acid such as stearic acid with beta-propiolactone, the intial reaction product, beta-stearyloxy propionic acid may react with additional beta-propiolactone as follows:

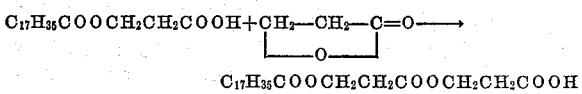

Continued reaction of this product with additional beta-propiolactone to form high molecular weight polyacyloxy acids also may occur.

When fatty alcohols are reacted with beta-propriolactone two reactions may take place as follows:

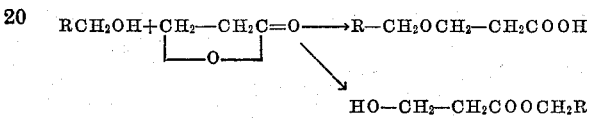

This mixture can add additional beta-propiolactone to form the following products:

$RCH_2OCH_2\text{-}CH_2\text{-}COOCH_2\text{-}CH_2\text{-}COOH$ $HOOC\text{-}CH_2\text{-}CH_2\text{-}OCH_2\text{-}CH_2\text{-}COOCH_2R$ $HO\text{-}CH_2\text{-}CH_2\text{-}COO\text{-}CH_2\text{-}CH_2\text{-}COO\text{-}CH_2\text{-}R$ In accordance with the method of this invention, the final reaction product contains from about 10 to 25 percent of compounds in which more than one mole of the lactone is combined with the fatty acid or fatty alcohol.

Fatty acids and fatty alcohols which may be reacted with the lactone are those acids and alcohols and mixtures thereof which are available commercially. These products are derived from natural animal and vegetable fats and oils. Examples of such compositions are mixed tallow and/or lard fatty acids, cottonseed oil fatty acids, coconut oil fatty acids, soybean oil fatty acids, and the like. Other fatty acids representative of those suitable for use include lauric acid, myristic acid, palmitic acid, oleic acid, linoleic acid and stearic acid. The preferred fatty acids and alcohols are those containing from about 6 to about 22 carbon atoms. Typical fatty alcohols are tallow fatty alcohols, stearyl alcohol, oleyl alcohol, and similar alcohols, and mixtures thereof derived from natural fats and oils. It is generally preferred that the fatty materials be hydrogenated to an iodine value of about 70–80 prior to reaction with the lactone, although unhydrogenated esters and alcohols may also be employed.

The time and temperature conditions under which the reaction is conducted are not critical. Since beta-propiolactone is a highly reactive compound it is possible to conduct the preparation simply by gently heating the reactants to initiate the reaction. It has been found that heating a mixture of the lactone and the fatty alcohol and ester to a temperature above about 100° C. is sufficient to force the reaction to substantial completion. Ordinarily the reaction is not carried out at a temperature in excess of about 150° C. since self polymerization of the lactone increases markedly at temperatures higher than this. Of course, lower temperatures and correspondingly longer reaction times may be employed in the production of the emulsifier, however.

The following examples, which are intended to be illustrative only and in no manner to be construed as limiting the invention, show the preparation of typical emulsifier compositions contemplated by this invention.

*Example I*

A charge of 260 grams (1 mol) of palmitic acid and 108 grams (1.5 mols) of propiolactone are slowly heated with stirring. The reactants which at the outset are not miscible become miscible at about 104° C., and heating is continued until the temperature reaches around 150° C. and held there for about three hours. At the end of this time the product is cooled to about 100° C., washed three times with hot water, and subjected to steam deodorization under reduced pressure. The bland product, after drying, may then be incorporated into a shortening prior to creaming.

*Example II*

A charge of double pressed stearic acid (276 lbs.) is placed in a reaction vessel and warmed to 110–130° C. with agitation to remove any moisture present in the sample. (The use of vacuum to hasten removal of moisture is optional.) At this temperature, 110–130° C., 72 lbs. beta-propiolactone is slowly added as the reaction mixture is thoroughly agitated and the temperature is then raised to about 150° C. The reactants are immiscible initially and the solution is turbid, but as the reaction proceeds toward completion the reaction mixture becomes clear. At 150° C. the turbidity disappears in about ½ hour, although heating and stirring are continued for about 3 hours to insure that all of the lactone is reacted. The mixture is then cooled to about 100° C. and washed with hot water by decantation to remove acidic materials. The solid fatty reaction product is dried prior to adding to shortening formulations.

*Example III*

A dried charge of 260 lbs. of tallow alcohols was heated to about 100° C. in an iron container and 72 lbs. beta-propiolactone was slowly added to the container as the charge was vigorously agitated. The temperature of the mixture was then raised to the range of 130–150° C. and the reaction was continued for about 3 to 5 hours at this temperature. After cooling the liquid and washing with water by decantation to remove acidic materials, the reaction product was dried to a soft pasty material.

*Example IV*

A mixture containing 276 lbs. stearic acid and 100 lbs. tallow alcohols was dried by agitation and heating to 110–130° C. in a reaction vessel. The dried mixture was then reacted with beta-propiolactone in accordance with the procedure set forth in Example I.

Acidic catalysts may advantageously be employed in the reaction and it has been found that a preferred bread tenderness index improver results from the process where a sulfuric acid catalyst is employed. Typical acidic catalysts useful in the process include sulfuric, hydrochloric, hydrobromic and phosphoric acids, as well as p-toluenesulfonic acid. Generally those acids having an ionization constant equal to or greater than phosphoric acid are suitable. About .05 to 0.5 percent based on the weight of the propiolactone, of the acid catalyst is preferred. The following example showing the sulfuric acid catalyzed reaction between palmitic acid and the lactone illustrates this embodiment of the invention.

*Example V*

1 mol (260 grams) of palmitic acid is melted by heating to about 70° C. The liquid fatty acid is then stirred and 0.45 gram of concentrated sulfuric acid is slowly added. When all of the acid has been added, 1.5 mols (108 grams) of propiolactone is slowly added to the stirred solution of palmitic acid and sulfuric acid. As the lactone is added, an exothermic action is initiated and the temperature of the reaction is permitted to rise to about 125° C., at which point the mixture is cooled and the remaining portion of the propiolactone is added at such a rate that no further significant temperature rise takes place. After the addition of all of the propiolactone, the mixture is held at 125–130° C. for about three hours. At the end of this time, the reaction mixture is cooled to about 100° C., washed with hot water, and the product is then deodorized and dried. This product, which is a superior bread tenderness index improver, may then be incorporated into a conventional shortening.

In the acid catalyzed reaction, although the acid is added at a slow rate in order to guard against an excessive increase in the reaction temperature, the final product is darker in color after the heating period. Although this color is not objectionable in view of the very small amount of additive which is required to impart superior properties to the shortening in which it is incorporated, it is possible to produce a product having a color substantially unchanged from the color of the original starting materials. The following example shows a procedure which may be followed to produce a product having a color which is substantially equivalent to that of the starting materials.

*Example VI*

One mol (260 grams) of palmitic acid is heated with 144 grams of propiolactone for 3 hours at a temperature of 130° C. At the end of this heating period, concentrated sulfuric acid is added to the heated mixture in small increments at such a rate that the temperature of the mixture does not exceed 140° C. As the temperature approaches 140° C. as a result of the addition of the concentrated acid, the addition is stopped and the mixture is permitted to cool to 130° C. before further additions of the acid are made. When no further temperature increase results from the addition of the acid, the addition of acid is stopped and the product after cooling it washed with hot water and deodorized and dried in conventional fashion. The palmityl beta-lactic acid resulting from this procedure is a clear pale off-white liquid.

The molar ratio of fatty acid to propiolactone most desirable in the production of an additive designed for use in improving the bread tenderness index may be varied from about 0.5 mols fatty acid:1 mol lactone to about 1 mol fatty acid:5 mols lactone. Smaller or larger ratios of the reactants may be employed in the formation of the additive, but the most desirable ratio for a particular fatty acid is best determined by baking tests.

The choice of the molar ratio of reactants will be governed by two factors, namely, cost of the lactone and effectiveness of the product as a bread tenderness index improver. In the case of the ratio 1.5 mols lactone to 1.0 mol fatty acid, this is merely considered a good balance between cost of the product and effectiveness in improving the tenderness index. While an additive prepared using a 2:1 lactone to fatty acid ratio is somewhat superior to that prepared employing a 1.5:1 ratio, the improvement in effectiveness is not commensurate with the increased cost of the product. Favorable results have been obtained, however, with products prepared from the lactone and stearic acid in a 5 to 1 molar ratio.

The emulsifier additive is incorporated in the shortening by any of the known commercial methods. For instance, the additive may be incorporated directly into the molten shortening and the mass agitated until solution is complete. Plasticizing of the molten shortening containing the additive evenly distributed therein may then be effected by chilling over a chill roller or an internal chilling machine such as a votator.

The amount of additive required to improve the dispersability of a shortening will vary both with the primary or any other emulsifier used in the shortening and the purpose for which the shortening is designed. Because of individual variations in the effectiveness of the primary emulsifiers, some of which are much more potent than others, greater or lesser amounts of the additive of this invention may be required. Generally for bread and yeast raised doughs excellent results are obtained by incorporating up to about 20 percent of the additive based on the weight of the shortening material, although amounts in the range of 3 to 10 percent are preferable. For pound and layer cakes and other cake like foods having a high sugar content, the present emulsifier may be used in conjunction with other emulsifier materials at a level of about 2 to 10 percent by weight of the other emulsifier material. The type of primary emulsifier employed as has been mentioned previously includes mono and diglycerides, sorbitol esters, or one of the many polyoxyalkylene glycol esters, or mixtures thereof. These materials are ordinarily used in amounts of about 2 to 10 percent of the shortening product.

The shortening component of the compositions of this invention may be selected from those plastic shortenings containing less than about 1.0 percent moisture and usually less than about 0.1 percent moisture by weight of the shortening. These shortenings are generally classified as all-hydrogenated and compound or blended types. Any of the conventional mixtures of animal and vegetable fats may be employed as the shortening component so long as it is hydrogenated to the proper consistency for blending. The following shortening formulations wherein parts are by weight, have been found particularly well suited for use in baking bread and yeast raised dough products such as buns, rolls, and coffee cakes and the like:

A. 90% lard, 10% reaction product of stearic acid and beta-propiolactone.

B. 90% hydrogenated vegetable shortening, 10% reaction product of stearic acid and beta-propiolactone.

C. 44% lard, 44% hydrogenated vegetable shortening, 12% reaction product of a mixture of tallow fatty acids and tallow alcohols with beta-propiolactone.

D. 85% lard, 7% monoglycerides of stearic acid, 3% diglycerides of stearic acid, 5% reaction product of stearic acid and beta-propiolactone.

E. 89% lard, 6% polyoxyalkylene stearate, 5% reaction product of stearic acid and beta-propiolactone.

The formulations which follow substantially improve the volume, texture and general cellular structure of cakes and sweet baked goods made with these formulations.

F. 96.7% hydrogenated cottonseed oil (iodine value= 75.0), 3.0% mono and diglycerides of hydrogenated vegetable oil fatty acids containing 40% monoglycerides and 30% diglycerides, having an iodine value of 75, 0.3% reaction product of stearic acid and beta-propiolactone.

G. 96.7% lard, 3.0% mono and diglycerides (as in formulation F), 0.3% reaction product of tallow fatty acids and beta-propiolactone.

H. 92.3% hydrogenated soybean oil (iodine value= 73.0), 7.0% mono and diglycerides of lard containing 25% monoglycerides and 35% diglycerides, 0.7% reaction product of stearyl alcohol and beta-propiolactone.

I. 95.7% lard, 4.0% sorbitan monostearate, 0.3% reaction product of lard fatty acids and beta propiolactone.

Shortening compositions containing typical emulsifiers of this invention were tested in the manner accepted by the art for their ability to increase cake volume. The additives were evaluated in the following baking test.

*Example VII*

Two pound cakes of the same formula with the exception of the shortening component were baked to compare the effect of the emulsifiers of this invention with a conventional emulsifying shortening.

| Formula: | Percent based on weight of flour |
|---|---|
| Cake flour | 100 |
| Sugar | 122 |
| Shortening | 72 |
| Whole eggs | 72 |
| Milk | 50 |
| Salt | 3 |
| Flavoring | 1 |

Batter density and volume for a cake baked with a shortening containing a mixture of the emulsifier of this invention and a conventional emulsifier was compared with cake baked with a shortening containing only the conventional emulsifier.

| Shortening | Batter Density | Cake Volume |
|---|---|---|
| (1) 95% hydrogenated cottonseed oil, 5% mono and diglycerides (65% active) | 0.765 | 1,280 |
| (2) 94.6% hydrogenated cottonseed oil, 5.0% mono and diglycerides (65% active), 0.4% reaction product of stearic acid with beta-propiolactone | 0.635 | 1,480 |

*Example VIII*

Lean layer cakes all made in accordance with the same formula with the exception of the shortening component were baked to illustrate the improvement which the emulsifiers of this invention impart to cakes.

| Formula: | Percent based on weight of flour |
|---|---|
| Cake flour | 100 |
| Sugar | 110 |
| Water | 110 |
| Shortening | 35 |
| Egg whites | 30 |
| Non-fat dry milk solids | 9 |
| Baking powder | 4 |
| Salt | 2 |
| Flavoring | 2 |

Shortenings containing the additives of this invention in conjunction with other emulsifiers and without other emulsifiers were compared with shortenings containing only monoglyceride emulsifiers.

| Shortening | Batter Density and Appearance | Cake Volume | Grain | Tenderness |
|---|---|---|---|---|
| (1) 100% hydrogenated vegetable oil | 1.1 Curdled | 1,040 | Open, coarse | Fragile. |
| (2) 97% lard, 3% lard monoglycerides (100% active) | 0.85 Slightly curdled | 1,150 | Good | Slightly firm. |
| (3) 96.7% lard, 3.0% lard monoglycerides (100% active), 0.3% reaction product of stearic acid with beta-propiolactone | 0.80 Smooth | 1,200 | Very good | Very good to slightly fragile. |
| (4) 97% hydrogenated vegetable oil, 3% reaction product of tallow fatty acids with beta-propiolactone | 0.85 Smooth | 1,170 | Very good | Very good. |

*Example IX*

Rich layer cakes were formulated in substantially the same manner as that set forth in Example V.

| Formula: | Percent based on weight of flour |
|---|---|
| Cake flour | 100 |
| Liquid milk | 95 |
| Egg whites | 75 |
| Shortening | 55 |
| Baking powder | 6 |
| Salt | 4 |
| Flavoring | 2 |

Shortenings used in the various cakes which were baked and the effect of the shortenings on cake structure is set forth in the table which follows:

| Shortening | Batter Density and Appearance | Cake Volume (cc.) | Grain | Tenderness |
|---|---|---|---|---|
| (1) 100% lard | 1.14 Curdled | 1,030 | Coarse | Fragile. |
| (2) 97% hydrogenated vegetable oil, 3% hydrogenated vegetable oil monoglycerides. | 0.88 Slightly curdled. | 1,100 | Good | Slightly firm to good. |
| (3) 96.7% hydrogenated vegetable oil, 3.0% vegetable oil monoglycerides, 0.3% reaction product of tallow alcohols and beta-propiolactone. | 0.82 Smooth | 1,180 | Very good. | Slightly fragile to very good. |
| (4) 97% lard, 3% reaction product of tallow fatty acid and beta-propiolactone. | 0.86 Smooth | 1,150 | Very good. | Very good. |

*Example X*

The advantages which shortenings containing the additives of this invention impart to bread samples is shown in the following table. All of the breads were baked with the same dough formula with the exception of the shortenings, the composition of which are shown below:

| Shortening | Water Absorption, Percent | Tenderness |
|---|---|---|
| (1) 100% lard | 65 | 1.0 |
| (2) 80% lard, 20% mono and diglycerides (6% active) | 68 | 0.77 |
| (3) 90% lard, 10% reaction product of stearic acid with beta-propiolactone. | 68 | 0.80 |
| (4) 85% lard, 10% mono and diglycerides (6% active), 5% reaction product of tallow fatty acids with beta-propiolactone. | 69 | 0.71 |

The values for water absorption and tenderness as set forth in the above example were determined in the following manner:

*Water absorption.*—In bread dough water absorption is a function to a small extent of the shortening used in preparing the dough. The ability of the dough to carry increased amounts of moisture is markedly reflected in the resistance to staling of the bread. The proper amount of absorption is determined rather empirically by the appearance and feel of the dough in the trough after mixing and also by the "clean-up time" in the dough mixers. The proper water absorption may be determined in the finished loaf from the break and shred of the loaf itself. The percentage of water in the dough is determined experimentally.

*Tenderness index.*—In general, a low tenderness index is to be desired. The lower limit on the tenderness index will be determined, however, by the limitation that a loaf should not be so tender that it cannot be sliced without tearing or cannot be satisfactorily handled on automatic conveyors. The tenderness index is measured on a modified Bloom Gelometer. A plunger having a one-inch diameter is placed on a slice of bread. The weight required to depress the plunger 4 mm. into the slice is recorded. The standard is a slice of bread from a loaf baked with lard as the shortening. The weight required to depress the plunger in the test slice is divided by the weight required to depress the plunger the required amount in the control slice to obtain the tenderness index. A more tender loaf will have an index less than one, while a tougher loaf or a loaf having more rapid staling properties will have an index greater than one. Tenderness indices are measured 72 hours after the loaf of bread is baked, and the loaf is packaged in a moisture-proof cellophane wrapper in the meantime.

Although the preceding examples deal primarily with bread and cakes, the shortening products of this invention may also be used advantageously in other food processing operations where an emulsifier type shortening is desirable. When used as the shortening constituent in icings, for example, a greater incorporation of air in the icings is assured, thus improving the spreadability of the icings.

This application is a continuation in part of our application Serial No. 608,684, filed September 10, 1956.

Obviously, many modifications and variations of the invention as hereinbefore set forth may be made without departing from the spirit and scope thereof, and therefore only such limitations should be imposed as are indicated in the appended claims.

We claim:

1. A shortening composition which comprises a major amount of glyceridic material having shortening properties and a minor amount of the mixture produced by the reaction between beta-propiolactone and fatty acids having from about 6 to about 22 carbon atoms.

2. The composition of claim 1 wherein the mixture is produced by the reaction between beta-propiolactone and palmitic acid.

3. The composition of claim 1 wherein the mixture is produced by the reaction between beta-propiolactone and stearic acid.

4. The composition of claim 1 wherein the mixture is produced by the reaction between beta-propiolactone and tallow fatty acids.

5. A method for improving the emulsifying properties of a superglycerinated shortening containing up to about 10 percent, based on the weight of the shortening, of mono- and diglycerides which comprises: adding to said shortening from about 2 percent to about 10 percent, based on the weight of the mono- and diglycerides, of the mixture produced by the reaction between beta-propiolactone and fatty acids having from about 6 to about 22 carbon atoms.

6. The composition of claim 1 wherein the fatty acid component is oleic acid.

7. The composition of claim 1 wherein the fatty acid component is lard fatty acids.

8. A method for improving the baking properties in bread and yeast-raised doughs of a shortening agent which comprises adding to a plastic shortening agent about 10% based on the weight of the shortening material of the mixture produced by the reaction between beta-propiolactone and fatty acids having from about 6 to about 22 carbons said mixture being added to said shortening in a molten form and plasticizing the molten shortening to effectively distribute the reaction product therethrough.

References Cited in the file of this patent

UNITED STATES PATENTS

| | | |
|---|---|---|
| 2,303,432 | Brown | Dec. 1, 1942 |
| 2,352,641 | Kung | July 4, 1944 |
| 2,690,971 | Iveson et al. | Oct. 5, 1954 |

UNITED STATES PATENT OFFICE

CERTIFICATION OF CORRECTION

Patent No. 2,963,371            December 6, 1960

Harland H. Young et al.

It is hereby certified that error appears in the above numbered patent requiring correction and that the said Letters Patent should read as corrected below.

Column 7, in the table of Example X, first column, lines 3 and 7 thereof, for "6%", each occurrence, read -- 65% --.

Signed and sealed this 2nd day of May 1961.

(SEAL)

Attest:
ERNEST W. SWIDER

Attesting Officer

DAVID L. LADD
Commissioner of Patents